United States Patent
Harris et al.

(10) Patent No.: US 12,511,022 B2
(45) Date of Patent: Dec. 30, 2025

(54) METHODS FOR FACILITATING ACCESS AND CUSTOMIZABLE INTERACTION WITH DATA VIA A CUSTOMIZED GRAPHICAL USER INTERFACE AND DEVICES THEREOF

(71) Applicant: JONES LANG LASALLE IP, INC., Chicago, IL (US)

(72) Inventors: Nathan Harris, London (GB); Joanna Sobota, Warsaw (PL); Kay Tang, London (GB)

(73) Assignee: JONES LANG LASALLE IP, INC., Chicago, IL (US)

( * ) Notice: Subject to any disclaimer, the term of this patent is extended or adjusted under 35 U.S.C. 154(b) by 0 days.

(21) Appl. No.: 18/123,540

(22) Filed: Mar. 20, 2023

(65) Prior Publication Data
US 2024/0319855 A1    Sep. 26, 2024

(51) Int. Cl.
*G06F 3/0481* (2022.01)
*G06F 3/04842* (2022.01)

(52) U.S. Cl.
CPC ........ *G06F 3/04842* (2013.01); *G06F 3/0481* (2013.01)

(58) Field of Classification Search
CPC .......................... G06F 3/0481; G06F 3/04842
See application file for complete search history.

(56) References Cited

U.S. PATENT DOCUMENTS

| | | | |
|---|---|---|---|
| 7,363,593 B1 * | 4/2008 | Loyens | G06F 16/26 715/713 |
| 8,487,931 B2 * | 7/2013 | Gaul | G06T 11/206 345/440.1 |

(Continued)

FOREIGN PATENT DOCUMENTS

| | | | | |
|---|---|---|---|---|
| CA | 2689026 A1 | * | 1/2011 | ......... G06K 9/00993 |
| CN | 112783762 A | * | 5/2021 | |
| CN | 115690303 A | * | 2/2023 | |

OTHER PUBLICATIONS

Raj Verma, "What is a BI Dashboard?", published on Mar. 24, 2022 to https://hevodata.com/learn/bi-dashboard, retrieved Jul. 26, 2023. (Year: 2022).*

(Continued)

*Primary Examiner* — Shourjo Dasgupta
(74) *Attorney, Agent, or Firm* — Troutman Pepper Locke LLP

(57) ABSTRACT

This technology facilitates access and customizable interaction with data by providing a graphical user interface which has interactive elements each comprising a different data visualization of initial data from a platform. Each of at least a subset of the interactive elements is configured to display a visual effect when a pointer is positioned over one of the interactive elements. Receipt of an input for one of the interactive elements that is displaying the visual effect is monitored for. A window is generated and provided to overlay the one of the interactive elements when the monitoring indicates the input is received. The window is configured to present: additional data associated with the initial data; and additional interactive elements each associated with a different interactions. Execution of one of the interactions is initiated when a selection of a corresponding one of the additional elements is received and a result is provided.

12 Claims, 7 Drawing Sheets

(56) References Cited

U.S. PATENT DOCUMENTS

| | | | | |
|---|---|---|---|---|
| 8,869,027 | B2* | 10/2014 | Louch | G06F 3/0481 715/779 |
| 9,529,892 | B2* | 12/2016 | Tibrewal | G06F 16/285 |
| 10,459,938 | B1* | 10/2019 | Agnew | G06F 3/0482 |
| 10,459,939 | B1* | 10/2019 | Agnew | G06T 11/206 |
| 10,853,380 | B1* | 12/2020 | Agnew | G06F 16/2428 |
| 10,861,202 | B1* | 12/2020 | Agnew | G06F 16/9535 |
| 11,037,342 | B1* | 6/2021 | Agnew | G06F 3/04847 |
| 11,164,093 | B1* | 11/2021 | Zappella | G06N 5/045 |
| 11,544,282 | B1* | 1/2023 | Chor | G06F 9/451 |
| 2002/0113816 | A1* | 8/2002 | Mitchell | H04L 41/044 715/734 |
| 2005/0114361 | A1* | 5/2005 | Roberts | G06F 8/38 707/999.102 |
| 2006/0031187 | A1* | 2/2006 | Pyrce | G06F 3/04815 |
| 2006/0061597 | A1* | 3/2006 | Hui | G06F 3/0481 345/629 |
| 2006/0095858 | A1* | 5/2006 | Hao | G06Q 10/10 715/764 |
| 2006/0101353 | A1* | 5/2006 | Clark | G06F 3/0481 715/792 |
| 2006/0106861 | A1* | 5/2006 | Torgerson | G06F 8/33 707/999.102 |
| 2009/0070710 | A1* | 3/2009 | Kagaya | G06F 16/44 715/810 |
| 2009/0222769 | A1* | 9/2009 | Sloo | G06F 16/168 715/854 |
| 2012/0123989 | A1* | 5/2012 | Yu | G06Q 10/0639 706/47 |
| 2012/0245745 | A1* | 9/2012 | Vandevelde | H02S 50/00 700/286 |
| 2012/0266074 | A1* | 10/2012 | Bhoovaraghavan | G06F 11/3466 715/738 |
| 2013/0198243 | A1* | 8/2013 | Givens | G06F 16/2428 707/805 |
| 2013/0275904 | A1* | 10/2013 | Bhaskaran | G06F 3/0484 715/771 |
| 2014/0085307 | A1* | 3/2014 | Lei | G06F 16/26 345/440 |
| 2015/0019700 | A1* | 1/2015 | Masterson | G06F 9/5072 709/223 |
| 2015/0052459 | A1* | 2/2015 | Sunil | G06F 9/451 715/760 |
| 2016/0034518 | A1* | 2/2016 | Sood | G06F 16/258 707/690 |
| 2018/0136638 | A1* | 5/2018 | Blakkan | G05B 19/41835 |
| 2019/0340304 | A1* | 11/2019 | Bak | G06F 16/904 |
| 2020/0363939 | A1* | 11/2020 | Fitzgerald | G06F 3/04845 |
| 2022/0083543 | A1* | 3/2022 | Obeidat | G06F 16/252 |
| 2022/0156698 | A1* | 5/2022 | Dua | G06Q 10/105 |
| 2022/0365637 | A1* | 11/2022 | Hunter | G06F 3/0481 |
| 2023/0008999 | A1* | 1/2023 | Beers | G06F 16/2246 |

OTHER PUBLICATIONS

Yellowfin BI, "What is drill down?—Definition and Overview", published on Dec. 6, 2020 to https://www.yellowfinbi.com/glossary/drill-down, retrieved Jul. 26, 2023. (Year: 2020).*

TIBCO Software, "Drilling down into details", published on Mar. 16, 2023 to https://docs.tibco.com/pub/sfire-cloud/12.4.0/doc/html/en-US/TIB_sfire_client/client/topics/en-US/drilling_down_into_details.html, retrieved Jul. 26, 2023. (Year: 2023).*

User Experience Stack Exchange, "Should a popup close automatically after a user selects an option from a tree menu?", last modified on Jan. 4, 2016 at https://ux.stackexchange.com/questions/19872/should-a-popup-close-automatically-after-a-user-selects-an-option-from-a-tree-me, retrieved Apr. 10, 2024. (Year: 2016).*

Nomensa, "How to improve the accessibility of overlay windows", published on Sep. 30, 2014 at https://www.nomensa.com/blog/how-improve-accessibility-overlay-windows-part-1, retrieved Apr. 10, 2024. (Year: 2014).*

Pega Support Center, "Pop up overlay model dialogue box should disappear after moving mouse pointer away from . . . ", last modified Oct. 16, 18 at https://support.pega.com/question/ pop-overlay-model-dialogue-box-should-disappear-after-moving-mouse-pointer-away-overlay, retrieved Apr. 10, 2024. (Year: 2018).*

Divi Life, "The Different Ways of Closing Divi Overlays Popups", published on Jul. 30, 2020 at https://divilife.com/docs/the-different-ways-of-closing-divi-overlays-popups, retrieved Apr. 10, 2024. (Year: 2020).*

Xi Chen, etc., "Composition and Configuration Patterns in Multiple-View Visualizations", published via IEEE Transactions on Visualization and Computer Graphics, vol. 27, No. 2, Feb. 2021, retrieved Nov. 1, 2025. (Year: 2021).*

Felipe Guimaraes, etc., "Dashboard: How to Create Efficient Data Visualization Design", published on Apr. 16, 2021 to https://www.aela.io/en/blog/all/dashboard-data-visualization-design, retrieved Nov. 1, 2025. (Year: 2021).*

"Dashboard Design", published on Aug. 9, 2020 to https://www.qlik.com/us/dashboard-examples/dashboard-design, retrieved Nov. 1, 2025. (Year: 2020).*

Benjamin Bach, etc., "Dashboard Design Patterns", published via IEEE Transactions on Visualization and Computer Graphics, vol. 29, No. 1, Jan. 2023, retrieved Nov. 1, 2025. (Year: 2023).*

Alper Sarikaya, etc., "What Do We Talk About When We Talk About Dashboards?", published via IEEE Transactions on Visualization and Computer Graphics, vol. 25, No. 1, Jan. 2019, retrieved Nov. 1, 2025. (Year: 2019).*

* cited by examiner

METHODS FOR FACILITATING ACCESS AND CUSTOMIZABLE INTERACTION WITH DATA VIA A CUSTOMIZED GRAPHICAL USER INTERFACE AND DEVICES THEREOF

FIELD

This technology relates to methods, non-transitory computer readable medium, and devices that facilitate access and customizable interaction with data via a customized graphical user interface.

BACKGROUND

Owners and facility managers of buildings commonly use applications which provide digital data visualizations, such as bar charts, to help monitor and manage operational metrics relating to their real estate assets. For example, the digital data visualizations in these applications may assist with monitoring maintenance work being carried out and tracking the time and cost expended on resolution of this maintenance work.

Unfortunately, the digital data visualizations with these prior applications are limited to providing a display of information with no capabilities to identify within the same application the specific information required to act on a particular problem identified by the data visualizations to take any other action. As a result, to take further action requires the owner or facility manager to infer or separately uncover, for example, a reference number from the data underpinning a visualization, such as a bar chart. Next, the owner or facility manager has to identify and access a separate system to cross-reference the number and discover data necessary to solve a problem (for example, the identity of the vendor tasked with resolving the problem).

SUMMARY

A method for facilitating access and customizable interaction with data includes providing, by a computing device, a graphical user interface which has a plurality of interactive elements each comprising a different data visualization of initial data from an executing data-and-insights management platform. Each of at least a subset of the interactive elements is configured to display a visual effect in the graphical user interface when a pointer is positioned over one of the interactive elements in the subset. Receipt of a selection input for one of the interactive elements in the subset that is displaying the visual effect is monitored for by the computing device. A user interface window is generated, by the computing device, which is provided to overlay the one of the interactive elements in the subset when the monitoring indicates a selection input is received. The generated user interface window is configured to present: additional data associated with the initial data in the data visualization for the one of the interactive elements in the subset; and a plurality of user interactive elements each associated with a different one of a plurality of executable interactions within the user interface window. Execution of one of the executable interactions is initiated, by the computing device, when a selection of a corresponding one of the plurality of user interactive elements in the user interface window is received. A result of the initiated execution of the one of the plurality of executable interactions is provided by the computing device.

A computing device with memory including programmed instructions stored thereon and one or more processors configured to execute the stored programmed instructions to provide a graphical user interface which has a plurality of interactive elements each comprising a different data visualization of initial data from an executing data-and-insights management platform. Each of at least a subset of the interactive elements is configured to display a visual effect in the graphical user interface when a pointer is positioned over one of the interactive elements in the subset. Receipt of a selection input for one of the interactive elements in the subset that is displaying the visual effect is monitored for. A user interface window is generated that is provided to overlay the one of the interactive elements in the subset when the monitoring indicates a selection input is received. The generated user interface window is configured to present: additional data associated with the initial data in the data visualization for the one of the interactive elements in the subset; and a plurality of user interactive elements each associated with a different one of a plurality of executable interactions within the user interface window. Execution of one of the executable interactions is initiated when a selection of a corresponding one of the plurality of user interactive elements in the user interface window is received. A result of the initiated execution of the one of the plurality of executable interactions is provided.

A non-transitory computer readable medium having stored thereon instructions that includes executable code that, when executed by one or more processors, causes the one or more processors to provide a graphical user interface which has a plurality of interactive elements each comprising a different data visualization of initial data from an executing data-and-insights management platform. Each of at least a subset of the interactive elements is configured to display a visual effect in the graphical user interface when a pointer is positioned over one of the interactive elements in the subset. Receipt of a selection input for one of the interactive elements in the subset that is displaying the visual effect is monitored for. A user interface window is generated that is provided to overlay the one of the interactive elements in the subset when the monitoring indicates a selection input is received. The generated user interface window is configured to present: additional data associated with the initial data in the data visualization for the one of the interactive elements in the subset; and a plurality of user interactive elements each associated with a different one of a plurality of executable interactions within the user interface window. Execution of one of the executable interactions is initiated when a selection of a corresponding one of the plurality of user interactive elements in the user interface window is received. A result of the initiated execution of the one of the plurality of executable interactions is provided.

This technology provides a number of advantages including providing methods, non-transitory computer readable media, and computing devices that facilitate access and customizable interaction with data via a customized graphical user interface. Examples of this technology are able to not only present data-and-insights, but are able to automatically provide different levels and specificity of data related to a particular issues as well as customized levels of functionality correlated to addressing the particular issue each of the different levels and specificity of data. As a result, this technology is able to facilitate the ease and time require to monitor, manage and address issues provided by a data-and-insights platform.

DETAILED DESCRIPTION

Figure 1:
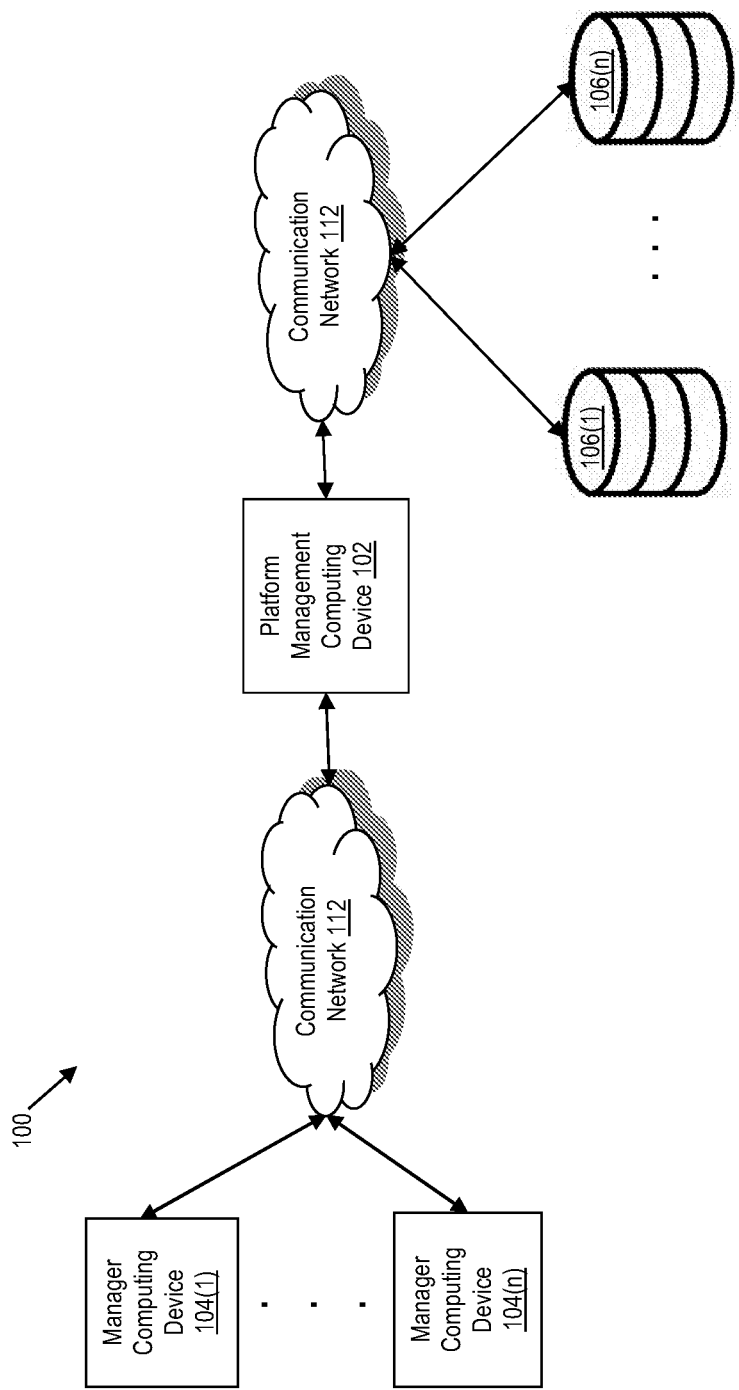
FIG. 1 is a block diagram of an exemplary network environment with a platform management computing device.
Figure 2:
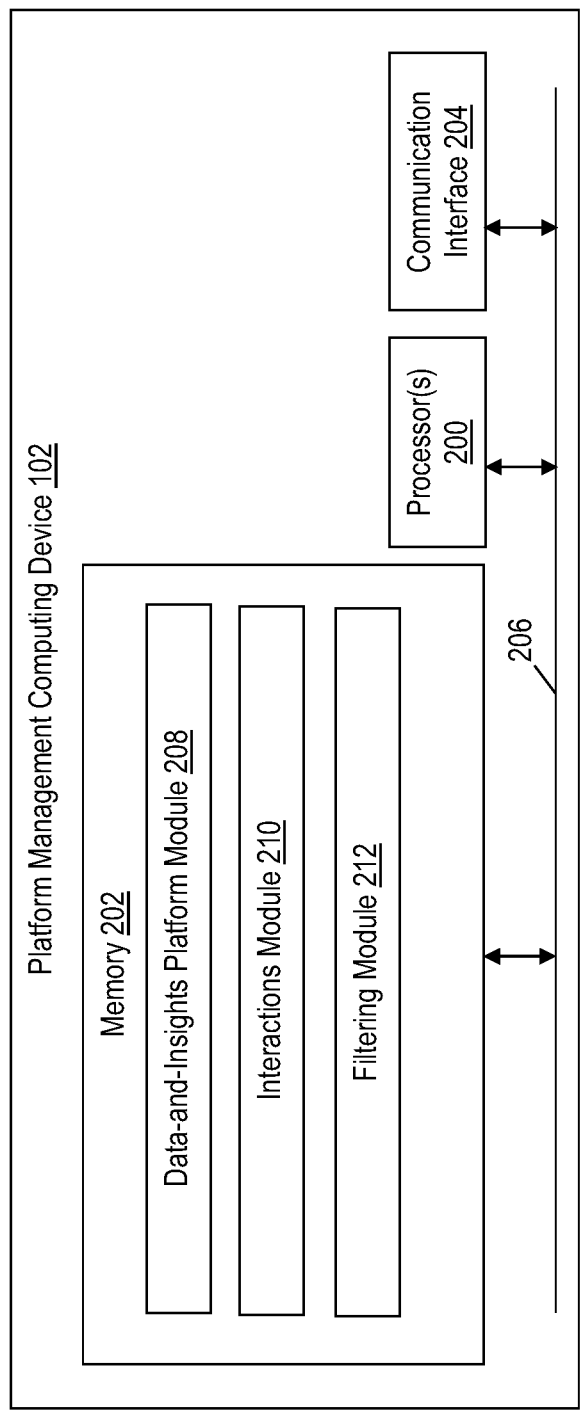
FIG. 2 is a block diagram of an exemplary platform management computing device.

A network environment 100 with an exemplary platform management computing device 102 configured to facilitate access and customizable interaction with data via a customized graphical user interface is shown in FIGS. 1 and 2. In this particular example, the environment 100 includes the platform management computing device 102, manager computing devices 104(1)-104(n), and databases 106(1)-106(n) which are coupled together via communication networks 112, although the environment could have other types and/or numbers of other systems, devices, components, and/or other elements in other configurations. This technology provides several advantages including providing methods, non-transitory computer readable media, and computing devices that facilitate access and customizable interaction with data via a customized graphical user interface.

Referring more specifically to FIGS. 1 and 2, the platform management computing device 102 of the network environment 100 may perform a number of different functions and/or other operations as illustrated and described by way of the examples herein, including facilitating access and customizable interaction with data via a customized graphical user interface. The platform management computing device 102 in this example includes processor(s) 200, a memory 202, and a communication interface 204, which are coupled together by a bus 206, although the platform management computing device 102 can include other types or numbers of elements in other configurations.

The processor(s) 200 of the platform management computing device 102 may execute programmed instructions stored in the memory 202 of the platform management computing device 102 for any number of the functions and other operations as illustrated and described by way of the examples herein. The processor(s) 200 may include one or more central processing units (CPUs) or general purpose processors with one or more processing cores, for example, although other types of processor(s) can also be used.

The memory 202 of the platform management computing device 102 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the platform management computing device 102, cause the platform management computing device 102 to perform actions, to facilitate access and customizable interaction with data via a customized graphical user interface as illustrated and described by way of the examples here. The application(s) can be implemented as components of other applications, operating system extensions, and/or plugins, for example.

Further, the application(s) may be operative in a cloud-based computing environment with access provided via a software-as-a-service model. The application(s) can be executed within or as virtual machine(s) or virtual server(s) that may be managed in a cloud-based computing environment. Also, the application(s), and even the platform management computing device 102 itself, may be located in virtual server(s) running in a cloud-based computing environment rather than being tied to specific physical network computing devices. Also, the application(s) may be running in virtual machines (VMs) executing on the platform management computing device 102 and managed or supervised by a hypervisor.

The memory 202 includes a real estate data-and-insights module 208, an interactions module 210, and a filtering module 212, although the memory may comprise other types and/or numbers of other modules, engines, programmed instructions and/or data. In this example, the real estate data-and-insights module 208 is configured to provide a real estate portfolio management application that provides dynamic graphical users interfaces with data visualizations to facilitate monitoring and management of real estate assets, although in other examples this module may execute other types and/or numbers of other functions and/or operations for other types of enterprise being managed. Additionally, the functionality module 210 is configured to a hierarchically arrangement of different levels of functionality integrated with the real estate management application, although this module may execute other types and/or numbers of other functions and/or operations in other examples. Further, the filtering module 212 is configured to provide further levels and formats of other corresponding data which can be configured to be displayed in new windows and/or to reconfigure and repopulate existing graphical user interfaces generated and provided by the real estate management applications, although this module may execute other types and/or numbers of other functions and/or operations in other examples.

The communication interface 204 of the platform management computing device 102 operatively couples and communicates between the platform management computing device 102 and one or more of the manager computing devices 104(1)-104(n), and/or the databases 106(1)-106(n), via one or more communication networks 112, although other types or numbers of communication networks or systems with other types or numbers of connections or configurations to other devices or elements can also be used.

While the platform management computing device 102 is illustrated in this example as including a single device, the platform management computing device 102 in other examples can include a plurality of devices each having one or more processors (each processor with one or more processing cores) that implement one or more steps of this technology. In these examples, one or more of the devices can have a dedicated communication interface or memory.

Alternatively, one or more of the devices can utilize the memory, communication interface, or other hardware or software components of one or more other devices included in the platform management computing device 102. Additionally, one or more of the devices that together comprise the platform management computing device 102 in other examples can be standalone devices or integrated with one or more other devices or apparatuses.

In this example, each of the manager computing devices 104(1)-104(n) includes one or more processors, a memory, user input device(s), such as keyboards and/or mouse pointers by way of example, a display, such as an LED or LCD display device, and a communication interface, which are coupled together by a bus or other communication link, although other types and/or numbers and types of components or other elements in other configurations could be used. In this example, each of the manager computing devices 104(1)-104(n) is used to interact with the platform management computing device 102 in the monitoring and management of real estate assets, although the manager computing devices could be operated by others for monitoring and managing other types of assets and operations.

The databases 106(1)-106(n) store real estate data associated with one or more managed real estate properties being monitored and managed in this example, although types and/or combinations of data and/or other programmed instructions may be stored and other storage locations may be used.

The communication networks 112 may be, for example, one or more of the same or different combinations of an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although other types and/or numbers of networks in other topologies or configurations may be used.

In this particular example, the platform management computing device 102, the manager computing devices 104(1)-104(n), and the databases 106(1)-106(n) are disclosed in FIG. 1 as dedicated hardware devices. However, one or more of the platform management computing device 102, the manager computing devices 104(1)-104(n), and the databases 106(1)-106(n) can be implemented in software within one or more other devices in the network environment 100.

Although the exemplary network environment 100 with the platform management computing device 102, the manager computing devices 104(1)-104(n), and the databases 106(1)-106(n) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the platform management computing device 102, the manager computing devices 104(1)-104(n), and the databases 106(1)-106(n), for example, may also be configured to operate as virtual instances on the same physical machine. In other words, one or more of the platform management computing device 102, the manager computing devices 104(1)-104(n), and the databases 106(1)-106(n) may operate on the same physical device rather than as separate devices communicating through one or more communication networks 112.

The examples of this technology may also be embodied as one or more non-transitory computer readable media having instructions stored thereon, such as in the memory 202 by way of example, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that are described and illustrated herein.

Figure 3:
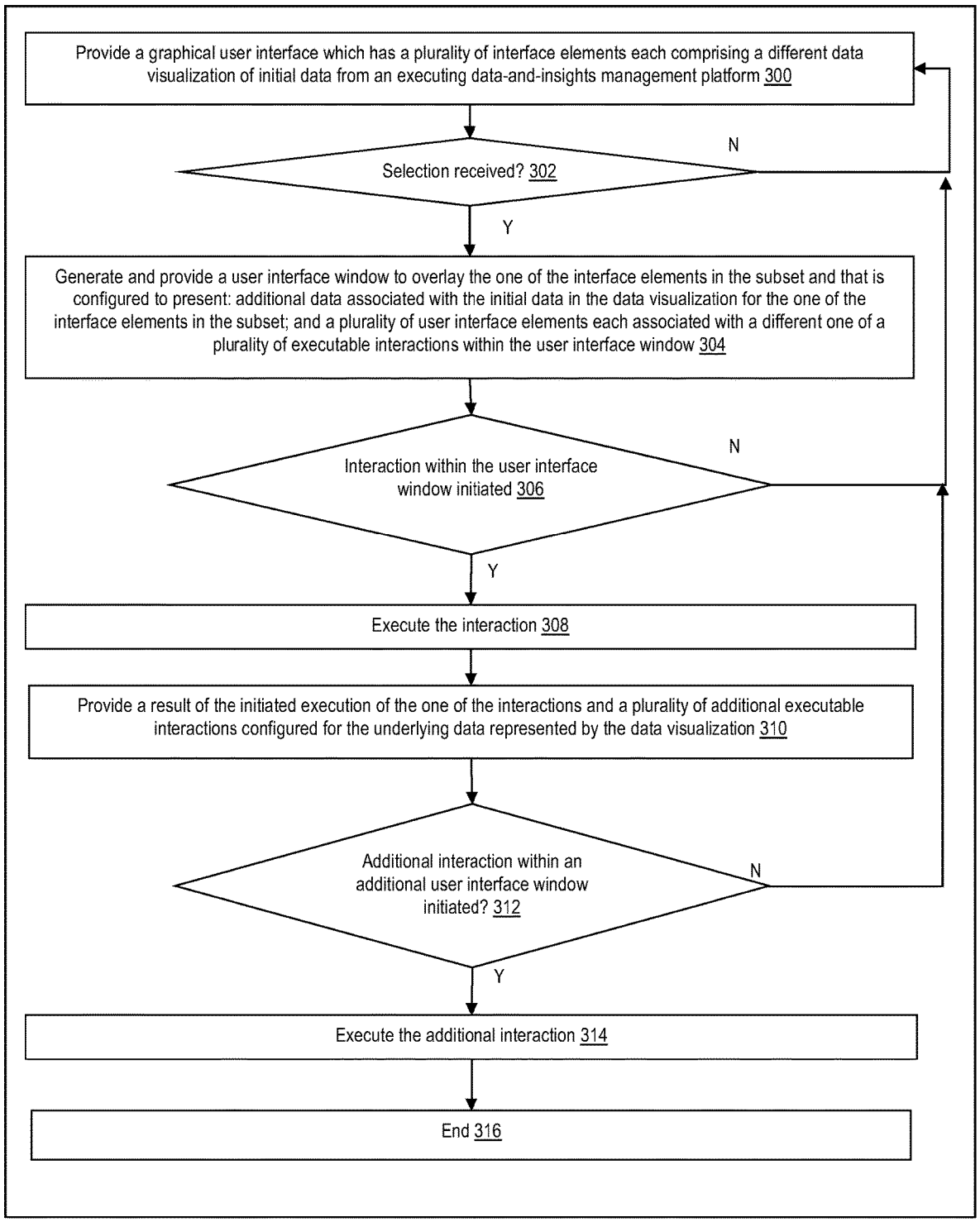
FIG. 3 is a flowchart of an exemplary method for facilitating access and customizable interaction with data via a customized graphical user interface.

Referring to FIG. 1-7, an exemplary method for facilitating access and customizable interaction with data via a customized graphical user interface is illustrated. More specifically, a flowchart of an exemplary method for facilitating access and customizable interaction with data via a customized graphical user interface is illustrated in FIG. 3.

Figure 4:
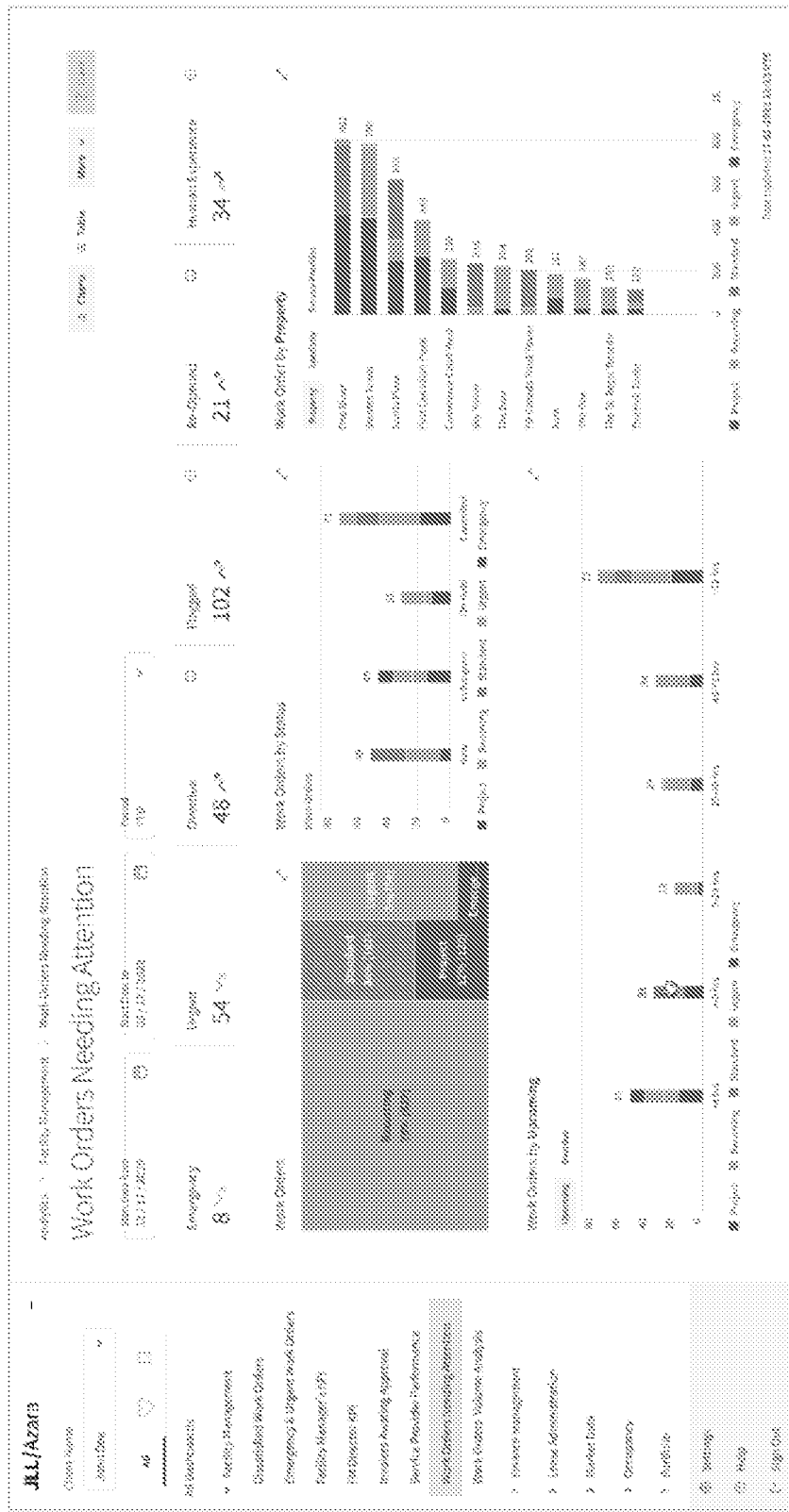
FIG. 4 is a screenshot of an exemplary customized graphical user interface for work orders needing attention that facilitates access and customizable interaction with data.

In this example, in step 300 the platform management computing device 102 provides a customized graphical user interface which has a plurality of interactive elements each comprising a different data visualization of initial data from an executing data-and-insights management platform 208 to a requesting one of the manager computing devices 104(1)-104(n). Each of at least a subset of the interactive elements in the customized graphical user interface is configured to display a visual effect when a cursor or other pointer or indicator is positioned over one of the interactive elements in the subset. A screenshot of an example of a customized graphical user interface generated by the data-and-insights platform module 208 is shown in FIG. 4. In this particular example, the exemplary customized graphical user interface illustrated "work orders needing attention" for real estate assets, in this example properties. This exemplary customized graphical user interface is generated to have a plurality of interactive elements, such as separate data visualizations for the work orders for each of the following time periods: <4 hours, 4-8 hours, 9-24 hours, 25-48 hours, 49-72 hours, and >72 hours, which each include a further breakdown of data on work orders which are considered to be a: project; recurring standard; urgent; and emergency, by way of example. This exemplary customized graphical user interface similarly illustrates a variety of other interactive elements, such as work orders by property by way of example only, which are configured to operate in the same manner in this example. This exemplary customized graphical user interface is further configured to provide a manager or other user at one of the manager computing devices 104(1)-104(n) in this example, a visual enhancement, such as a darkening visual effect when the user's cursor or other pointer or indicator associated with one of the manager computing devices 104(1)-104(n) hovers over one such interactive element, although other types and/or numbers of enhancements could be provided. The enhancement signals to the manager or user at one of the manager computing devices 104(1)-104(n) that further interaction with that interactive element is available.

In step 302, the platform management computing device 102 monitors for receipt of a selection input for one of the interactive elements that is displaying the visual effect from a user input device associated with one of the manager computing devices 104(1)-104(n). If in step 302, the platform management computing device 102 monitors for and does not detect receipt of a selection input for one of the interactive elements that is displaying the visual effect, then the No branch is taken back to step 300 as described earlier. If in step 302, the platform management computing device 102 monitors for and detects receipt of a selection input for one of the interactive elements that is displaying the visual effect, then the Yes branch is taken back to step 304.

Figure 5:
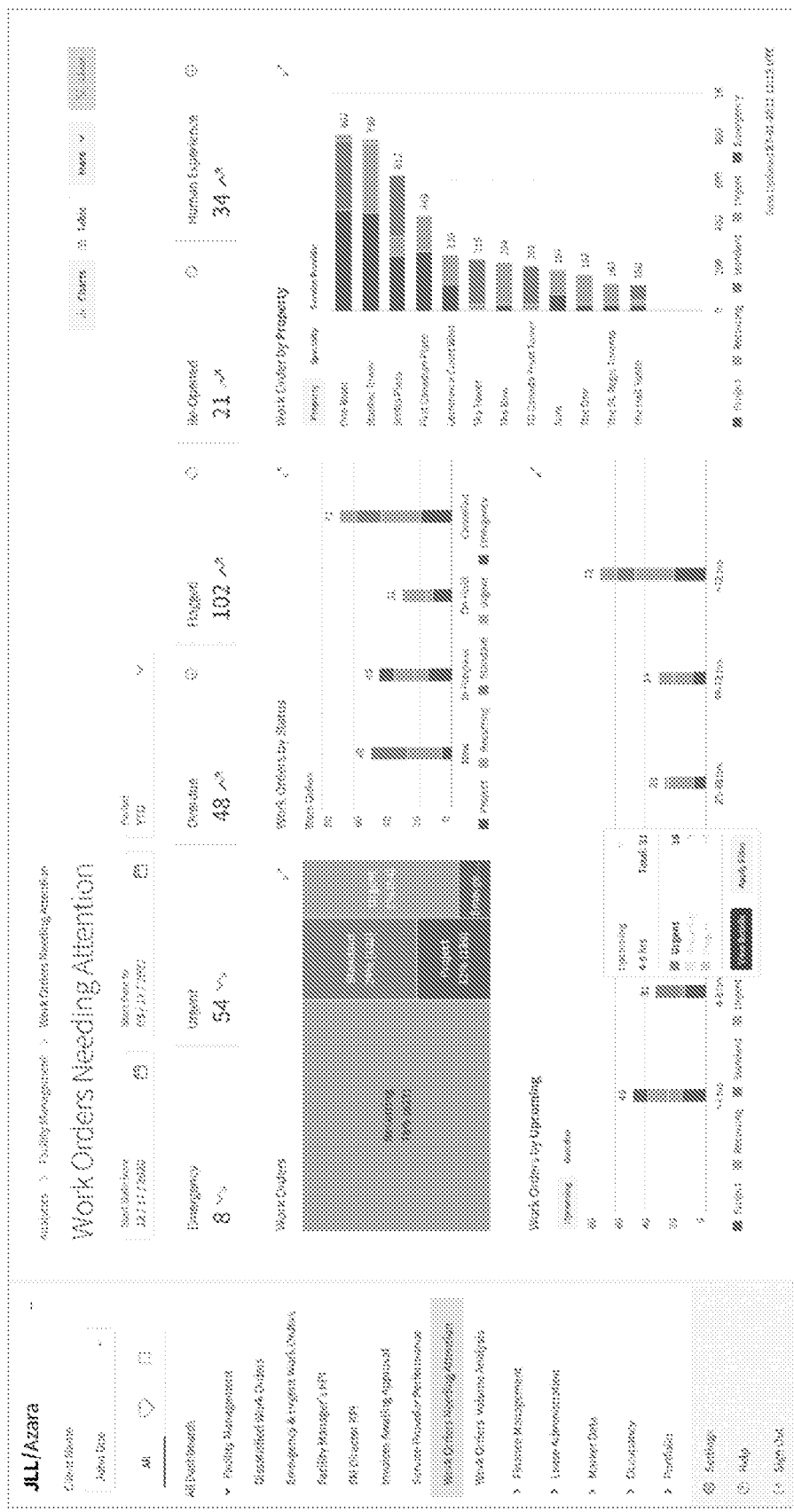
FIG. 5 is a screenshot of the exemplary customized graphical user interface for work orders needing attention with an overlayed user interface window.

In step 304, the platform management computing device 102 generates and provides a user interface window to overlay the one of the interactive elements where the selection input was received. In this example, the generated user interface window is configured to present within the customize graphical user interface: additional data associated with the initial data in the data visualization for the one of the interactive elements in the subset; and a plurality of user interactive elements each associated with a different one of a plurality of executable interactions customized for that additional data within the user interface window, although other types and/or amounts of other data and other functionality could be provided. An example of a screenshot of the customized graphical user interface for work orders needing attention with an overlayed user interface window is illustrated in FIG. 5. As illustrated, this overlayed user window provides additional data associated with the initial data in the data visualization for the one of the interactive elements in the subset and also a plurality of user interactive elements each associated with a different one of a plurality of executable interactions within the user interface window and customized for this additional data, although other types and/or amounts of data and/or other functionality could be provided. In this example, the plurality of user interactive elements each associated with a different one of a plurality of executable interactions comprise further interactions within the window (although other types and/or numbers of operations or other functions could be programmed and selected for execution), such as;
1. Close the window [an 'x' icon];
2. View details button [which will open the underlying data represented by the data visualization element in a new window-see FIGS. 6]; and
3. Apply filter button [which will transform the data visualization to focus on the selected data element-see FIG. 7.]

In step 306, the platform management computing device 106 monitors for selection of one of the executable interactions within the user interface window. If in step 306, the platform management computing device 106 monitors and does not detect a selection of one of the executable interactions within the user interface window, then the No branch is taken back to step 300 as described earlier. If in step 306, the platform management computing device 106 monitors and detects a selection of one of the executable interactions within the user interface window, then the Yes branch is taken back to step 308.

In step 308, the platform management computing device 106 executes one of the executable interactions with respect to this additional data when a selection of a corresponding one of the plurality of user interactive elements in the user interface window is received. In this example, the executable interactions comprise the 'x' icon to close the overlayed window, the View details button to present the additional data represented by the data visualization element in another overlayed new window, and the apply filter button to transform the customized graphical user interface (which retains the same format and layout) with on the additional data in the selected data visualization element, although other types and/or numbers of executable interactions customized for the particular additional data can be provided.

Figure 6:
FIG. 6 is a screenshot of the exemplary customized graphical user interface for work orders needing attention with a window with underlying data.
Figure 7:
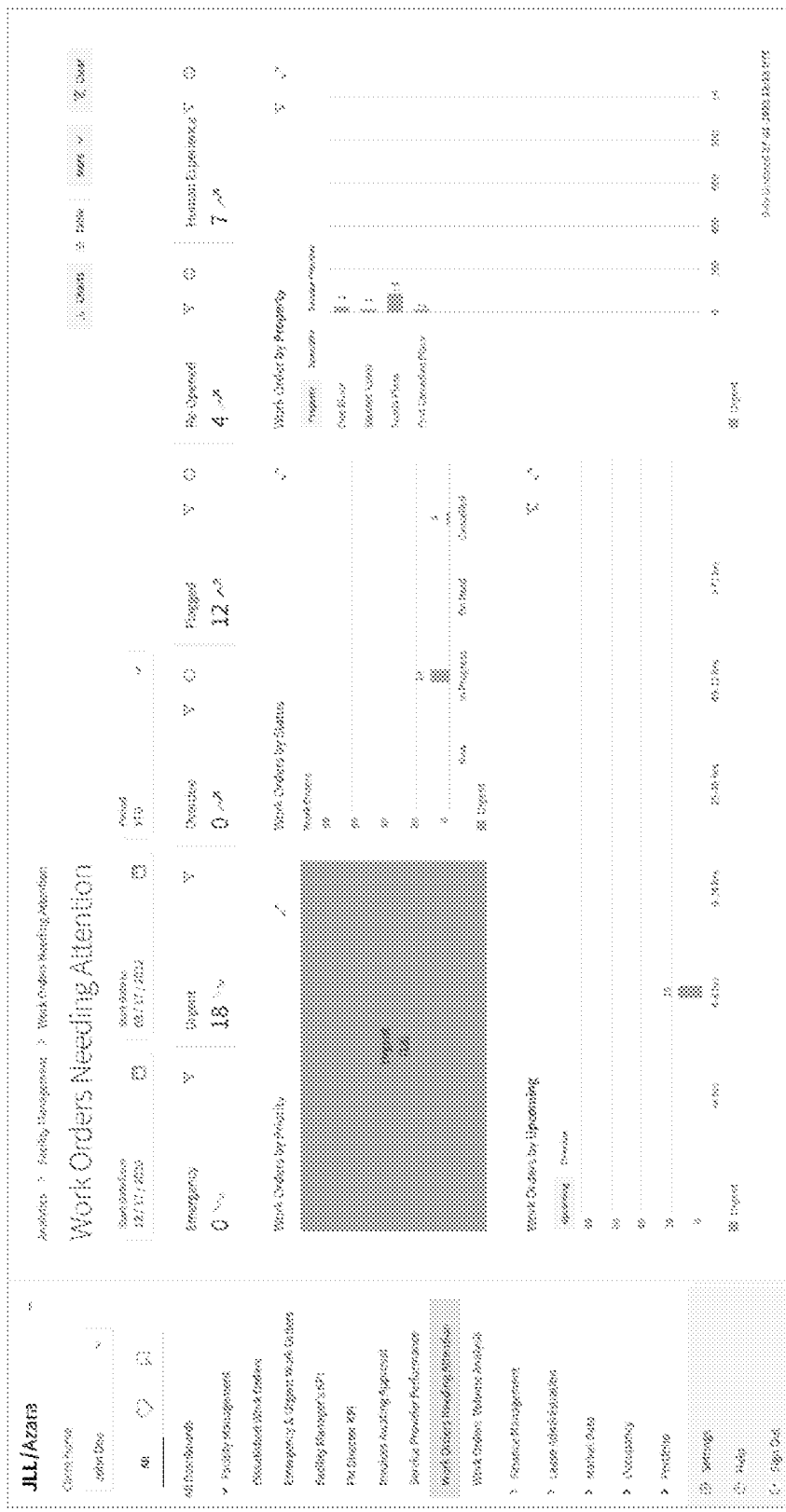
FIG. 7 is a screenshot of the exemplary customized graphical user interface for work orders needing attention transformed to focus on a selected data element.

In step 310, the platform management computing device 106 provides a result of the initiated execution of the one of the plurality of executable interactions on the additional data along with a plurality of additional executable interactions configured for this provided result. In this example, if the user at one of the management computing devices 106(1)-106(n) selects the 'x' icon, then the overlayed window shown in FIG. 5 would be closed. Additionally, if in this example the user at one of the management computing devices 106(1)-106(n) selects the View details button, then the additional data represented by the data visualization element is presented in another overlayed new window as shown in FIG. 6. Further, if in this example the user at one of the management computing devices 106(1)-106(n) selects the apply filter button, then the customized graphical user interface retains the same format and layout, but is transformed to focus on the data in the data visualization element as shown in FIG. 7. In this example, the additional executable interactions configured for the underlying data represented by the data visualization comprise export, copying, or a portion or all of the underlying data, although other types and/or numbers of interactions may be used, such as automated interactions to address the work orders needing attention by way of example only. Accordingly, as illustrated by way of the examples herein, the platform management computing device 106 is able to provide a customized graphical user interface with interface elements which can be customized to provide different levels of additional data that is available along with executable interactions which are customized to each of the levels.

In step 312, the platform management computing device 106 monitors for selection of one of the additional executable interactions within the user interface window by the user at one of the manager computing devices 104(1)-104(n) in this example. If in step 312, the platform management computing device 106 monitors for and does not detect a selection of one of the additional executable interactions, then the No branch is taken back to step 300 as described earlier. If in step 312, the platform management computing device 106 monitors and detects a selection of one of the additional executable interactions, then the Yes branch is taken back to step 314.

In step 314, the platform management computing device 106 executes the selected one of the additional interactions. By way of example, if the exporting interaction is selected by the platform management computing device 106, then the data may automatically be exported to a messaging application, such as an email application, which can be populated based on stored instructions and transmitted to a third party device designated to assist with the particular exported data for the work order needing attention, such as an email to order a particular part or parts from a vendor and/or another email to a contractor to address the work order needing attention, although other types and/or numbers of interactions with other functions and/or other operations may be configured. In step 316 this example of the method may end.

Accordingly, as described and illustrated by way of the examples herein, this technology provides methods, non-transitory computer readable media, and computing devices that facilitate access and customizable interaction with data via a customized graphical user interface. As illustrated by the examples herein, this technology within the data-and-insights application provides a customized graphical user interface that can be adjusted with overlayed windows and/or transformation and can provide a variety of different and automated interactions customized to the particular data at each of the levels without leaving the customized graphical user interface. As a result, examples of this technology further enhance the ability of the data-and-insights application to facilitate management of enterprises, such as portfolio of real estate assets by way of example, within the same customized graphical user interface.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method implemented by one or more computing devices, the method comprising:
    providing, by a computing device, a graphical user interface which has a plurality of interactive elements each comprising a different data visualization of initial data from an executing data-and-insights management platform, wherein each of at least a subset of the interactive elements is configured to display at least a portion of the initial data and a visual effect in the graphical user interface when a pointer is positioned over one of the interactive elements in the subset;
    monitoring, by the computing device, for when a selection input is received for one of the interactive elements in the subset that is displaying the visual effect;
    receiving, by the computing device, the selection input for one of the interactive elements in the subset that is displaying the visual effect;
    generating, by the computing device, a user interface window that is provided to overlay the one of the interactive elements in the subset based on the received selection input for one of the interactive elements in the subset that is displaying the visual effect, wherein the user interface window is configured to present:
        a subset of the initial data in the data visualization for the one of the interactive elements in the subset; and
        a plurality of user interactive elements each associated with a different one of a plurality of executable interactions within the user interface window;
    receiving, by the computing device, the selection of a corresponding one of the plurality of user interactive elements in the user interface window;
    initiating, by the computing device, execution of one of the executable interactions based on the received selection of the corresponding one of the plurality of user interactive elements in the user interface window, wherein the one of the executable interactions further comprises:
        closing, by the computing device, the user interface window; and
        generating, by the computing device, an additional graphical user interface at another hierarchical level to replace the graphical user interface at a prior hierarchical level, wherein the additional graphical user interface has an identical layout with the same plurality of interactive elements as the graphical user interface, wherein the same plurality of interactive elements in the additional graphical user interface are positioned in the same locations as in the graphical user interface, and wherein each of the at least a subset of the interactive elements in the additional graphical user interface is configured to display at least a portion of the subset of the initial data that corresponds to a filtered version of the initial data based on the received selection input; and
    providing, by the computing device, a result of the initiated execution of the one of the plurality of executable interactions.

2. The method as set forth in claim 1 further comprising:
    providing, by the computing device, a plurality of additional executable interactions configured for the subset of the initial data represented by the data visualization for the one of the interactive elements in the subset.

3. The method as set forth in claim 2 wherein the plurality of additional executable interactions in the additional user interface window further comprise:
    enabling, by the computing device, at least a portion of the underlying initial data to be exported, copied, or moved to another executable application.

4. The method as set forth in claim 3 wherein the another executable application comprises a messaging application configured to automatically transmit one of a plurality of stored messages corresponding to the at least portion of the underlying data and to one of a plurality of stored destinations.

5. A computing device, comprising memory comprising programmed instructions stored thereon and one or more processors configured to execute the stored programmed instructions to:
    provide a graphical user interface which has a plurality of interactive elements each comprising a different data visualization of initial data from an executing data-and-insights management platform, wherein each of at least a subset of the interactive elements is configured to display at least a portion of the initial data and a visual effect in the graphical user interface when a pointer is positioned over one of the interactive elements in the subset;
    monitor for when a selection input is received for one of the interactive elements in the subset that is displaying the visual effect;
    receive the selection input for one of the interactive elements in the subset that is displaying the visual effect;
    generate a user interface window that is provided to overlay the one of the interactive elements in the subset based on the received selection input for one of the interactive elements in the subset that is displaying the visual effect, wherein the user interface window is configured to present:
        a subset of the initial data in the data visualization for the one of the interactive elements in the subset; and
        a plurality of user interactive elements each associated with a different one of a plurality of executable interactions within the user interface window;
    receive the selection of a corresponding one of the plurality of user interactive elements in the user interface window;
    initiate execution of one of the executable interactions based on the received selection of the corresponding one of the plurality of user interactive elements in the user interface window, wherein the one of the executable interactions further comprises:
　closing the user interface window; and
　generating an additional graphical user interface at another hierarchical level to replace the graphical user interface at a prior hierarchical level, wherein the additional graphical user interface has an identical layout with the same plurality of interactive elements as the graphical user interface, wherein the same plurality of interactive elements in the additional graphical user interface are positioned in the same locations as in the graphical user interface, and wherein each of the at least a subset of the interactive elements in the additional graphical user interface is configured to display at least a portion of the subset of the initial data that corresponds to a filtered version of the initial data based on the received selection input; and
provide a result of the initiated execution of the one of the plurality of executable interactions.

6. The device as set forth in claim 5 further comprising:
provide a plurality of additional executable interactions configured for the subset of the initial data represented by the data visualization for the one of the interactive elements in the subset.

7. The device as set forth in claim 6 wherein the plurality of additional executable interactions in the additional user interface window further comprise:
　enabling at least a portion of the underlying initial data to be exported, copied, or moved to another executable application.

8. The device as set forth in claim 7 wherein the another executable application comprises a messaging application configured to automatically transmit one of a plurality of stored messages corresponding to the at least portion of the underlying data and to one of a plurality of stored destinations.

9. A non-transitory computer readable medium having stored thereon instructions comprising executable code which when executed by one or more processors, causes the processors to:
　provide a graphical user interface which has a plurality of interactive elements each comprising a different data visualization of initial data from an executing data-and-insights management platform, wherein each of at least a subset of the interactive elements is configured to display at least a portion of the initial data and a visual effect in the graphical user interface when a pointer is positioned over one of the interactive elements in the subset;
　monitor for when a selection input is received for one of the interactive elements in the subset that is displaying the visual effect;
　receive the selection input for one of the interactive elements in the subset that is displaying the visual effect;
　generate a user interface window that is provided to overlay the one of the interactive elements in the subset based on the received selection input for one of the interactive elements in the subset that is displaying the visual effect, wherein the user interface window is configured to present:
　　a subset of the initial data in the data visualization for the one of the interactive elements in the subset; and
　　a plurality of user interactive elements each associated with a different one of a plurality of executable interactions within the user interface window;
　receive the selection of a corresponding one of the plurality of user interactive elements in the user interface window;
　initiate execution of one of the executable interactions based on the received selection of the corresponding one of the plurality of user interactive elements in the user interface window, wherein the one of the executable interactions further comprises:
　　closing the user interface window; and
　　generating an additional graphical user interface at another hierarchical level to replace the graphical user interface at a prior hierarchical level, wherein the additional graphical user interface has an identical layout with the same plurality of interactive elements as the graphical user interface, wherein the same plurality of interactive elements in the additional graphical user interface are positioned in the same locations as in the graphical user interface, and wherein each of the at least a subset of the interactive elements in the additional graphical user interface is configured to display at least a portion of the subset of the initial data that corresponds to a filtered version of the initial data based on the received selection input; and
provide a result of the initiated execution of the one of the plurality of executable interactions.

10. The non-transitory computer readable medium as set forth in claim 9 further comprising:
provide a plurality of additional executable interactions configured for the subset of the initial data represented by the data visualization for the one of the interactive elements in the subset.

11. The non-transitory computer readable medium as set forth in claim 10 wherein the plurality of additional executable interactions in the additional user interface window further comprise:
　enabling at least a portion of the underlying initial g data to be exported, copied, or moved to another executable application.

12. The non-transitory computer readable medium as set forth in claim 11 wherein the another executable application comprises a messaging application configured to automatically transmit one of a plurality of stored messages corresponding to the at least portion of the underlying data and to one of a plurality of stored destinations.

\* \* \* \* \*